United States Patent [19]

Krishnakumar et al.

[11] Patent Number: 5,599,496
[45] Date of Patent: Feb. 4, 1997

[54] METHOD OF MAKING A REFILLABLE POLYESTER CONTAINER

[75] Inventors: Suppayan M. Krishnakumar, Nashua; Wayne N. Collette, Merrimack; Thomas E. Nahill, Amherst, all of N.H.

[73] Assignee: Continental PET Technologies, Inc., Florence, Ky.

[21] Appl. No.: 312,890

[22] Filed: Sep. 27, 1994

Related U.S. Application Data

[63] Continuation of Ser. No. 55,860, Apr. 30, 1993, abandoned, which is a continuation of Ser. No. 758,801, Sep. 12, 1991, abandoned, which is a division of Ser. No. 488,247, Mar. 5, 1990, Pat. No. 5,066,528.

[51] Int. Cl.$^6$ ............................................. B29C 49/08
[52] U.S. Cl. .......................................... 264/532; 264/537
[58] Field of Search ............................. 264/523, 532, 264/537

[56] References Cited

U.S. PATENT DOCUMENTS

| | | |
|---|---|---|
| 3,137,748 | 6/1964 | Makowski . |
| 3,417,892 | 12/1968 | Schweiger . |
| 3,865,531 | 2/1975 | Moore et al. . |
| 3,881,621 | 5/1975 | Adomaitis . |
| 3,948,404 | 4/1976 | Collins et al. . |
| 3,955,697 | 5/1976 | Valyi . |
| 4,108,324 | 8/1978 | Krishnakumar . |
| 4,134,510 | 1/1979 | Chang . |
| 4,247,012 | 1/1981 | Alberghini . |
| 4,330,579 | 5/1982 | Ota et al. . |

(List continued on next page.)

FOREIGN PATENT DOCUMENTS

| | | |
|---|---|---|
| 3689378 | 6/1978 | Australia . |
| 7923382 | 1/1982 | Australia . |
| 0042132 | 6/1981 | European Pat. Off. . |
| 2246712 | 1/1980 | France . |
| 2910609 | 9/1980 | Germany . |
| 56-120320 | 9/1981 | Japan . |
| 57-113033 | 7/1982 | Japan ..................... 264/532 |
| 58-185229 | 10/1983 | Japan . |
| 59-73925 | 4/1984 | Japan . |
| 60-73829 | 4/1985 | Japan ..................... 264/532 |
| 63-78706 | 4/1988 | Japan . |
| 2102724 | 2/1983 | United Kingdom .................... 264/532 |

OTHER PUBLICATIONS

"A Discussion Of Plastic Processing, 3 Blowing Molds," BASF AG, 1973 (in German with English translation).

Plester, G., "Refillable Plastic Bottles — The Technical Challenge And The Practical Experience," 10th International Conference, High Performance Plastic Packaging, Organized By The Society Of Plastics Engineers International (European Section), Dusseldorf, Oct. 31–Nov. 1, 1989, pp 1, 2 (in English).

Vogelpohl, H., "Suitability of PET Bottles As One–Way And Returnable Containers For The Filling of $CO_2$–Containing Drinks," Getraenkatechnik, 1988, 4, (8), 140–146 (in German with English translation).

"Returnable Plastics Bottle: A Child With Three Fathers," Verpackungs Berater, 1986, 30, (12), 37, 38 (in German with English translation).

"Coca–Cola Shocks The Industry," Getrankeindustrie, Jan. 1987, 41 (1), pp. 17–24 (in German with English translation).

Primary Examiner—Catherine Timm
Attorney, Agent, or Firm—Wolf, Greenfield & Sacks, P.C.

[57] ABSTRACT

Method of making a refillable polyester container having a low orientation base with improved resistance to caustic wash cracking. The method includes providing a preform with an upper base-forming thickened portion which resists axial elongation (thereby increasing the orientation of the body) and a lower base-forming tapered portion which decreases in thickness so as to gradually reduce the wall thickness of a central dome in the container base. The bottom of the preform base includes a central thickened region which is maintained in a recess during blowing to insure centering and prevent the formation of stress concentrations.

14 Claims, 3 Drawing Sheets

U.S. PATENT DOCUMENTS

| | | |
|---|---|---|
| 4,334,627 | 6/1982 | Krishnakumar et al. . |
| 4,406,854 | 9/1983 | Yoshino . |
| 4,465,199 | 8/1984 | Aoki . |
| 4,502,607 | 3/1985 | Szajna . |
| 4,525,401 | 6/1985 | Pocock . |
| 4,598,831 | 7/1986 | Nakamura et al. . |
| 4,615,667 | 10/1986 | Roy ........................................ 264/532 |
| 4,618,515 | 10/1986 | Collette . |
| 4,665,682 | 5/1987 | Kerins . |
| 4,725,464 | 2/1988 | Collette . |
| 4,755,404 | 7/1988 | Collette . |
| 4,780,257 | 10/1988 | Beck ........................................ 264/537 |
| 4,850,494 | 7/1989 | Howland . |
| 4,867,323 | 9/1989 | Powers . |
| 4,880,593 | 11/1989 | Strassheimer . |
| 4,885,197 | 12/1989 | Strassheimer . |
| 4,889,752 | 12/1989 | Beck . |
| 4,892,205 | 1/1990 | Powers et al. . |
| 4,915,992 | 4/1990 | Takakusaki et al. . |
| 4,927,679 | 5/1990 | Beck ........................................ 264/532 |
| 4,969,563 | 11/1990 | Strassheimer . |
| 4,978,015 | 12/1990 | Walker . |
| 4,981,736 | 1/1991 | Feddersen et al. . |
| 5,005,716 | 4/1991 | Eberle . |
| 5,066,528 | 11/1991 | Krishnakumar et al. . |

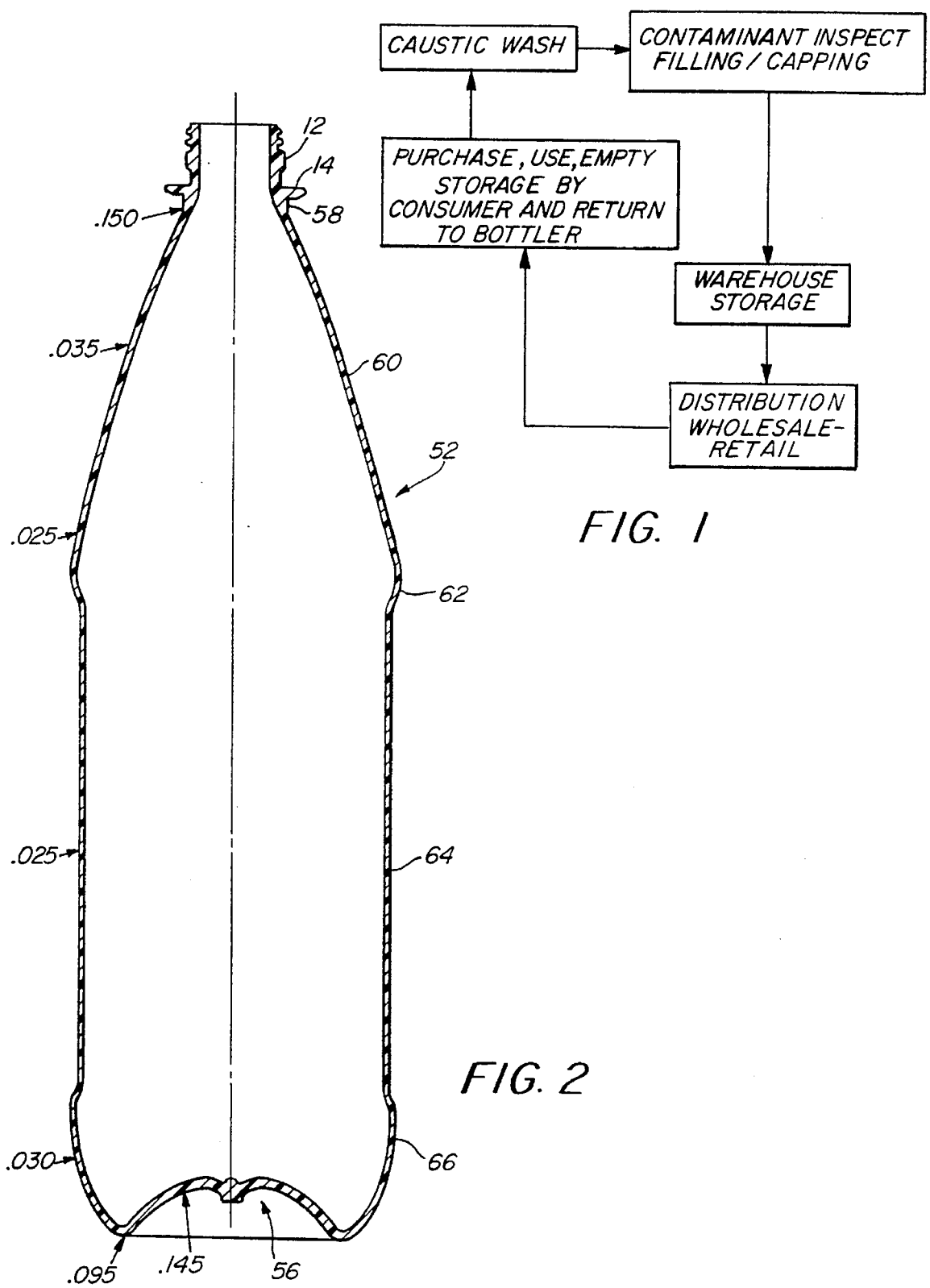

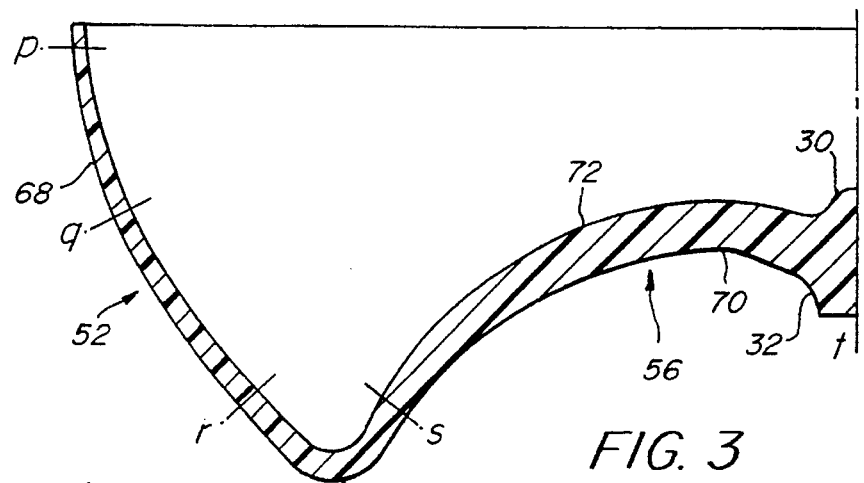
FIG. 3
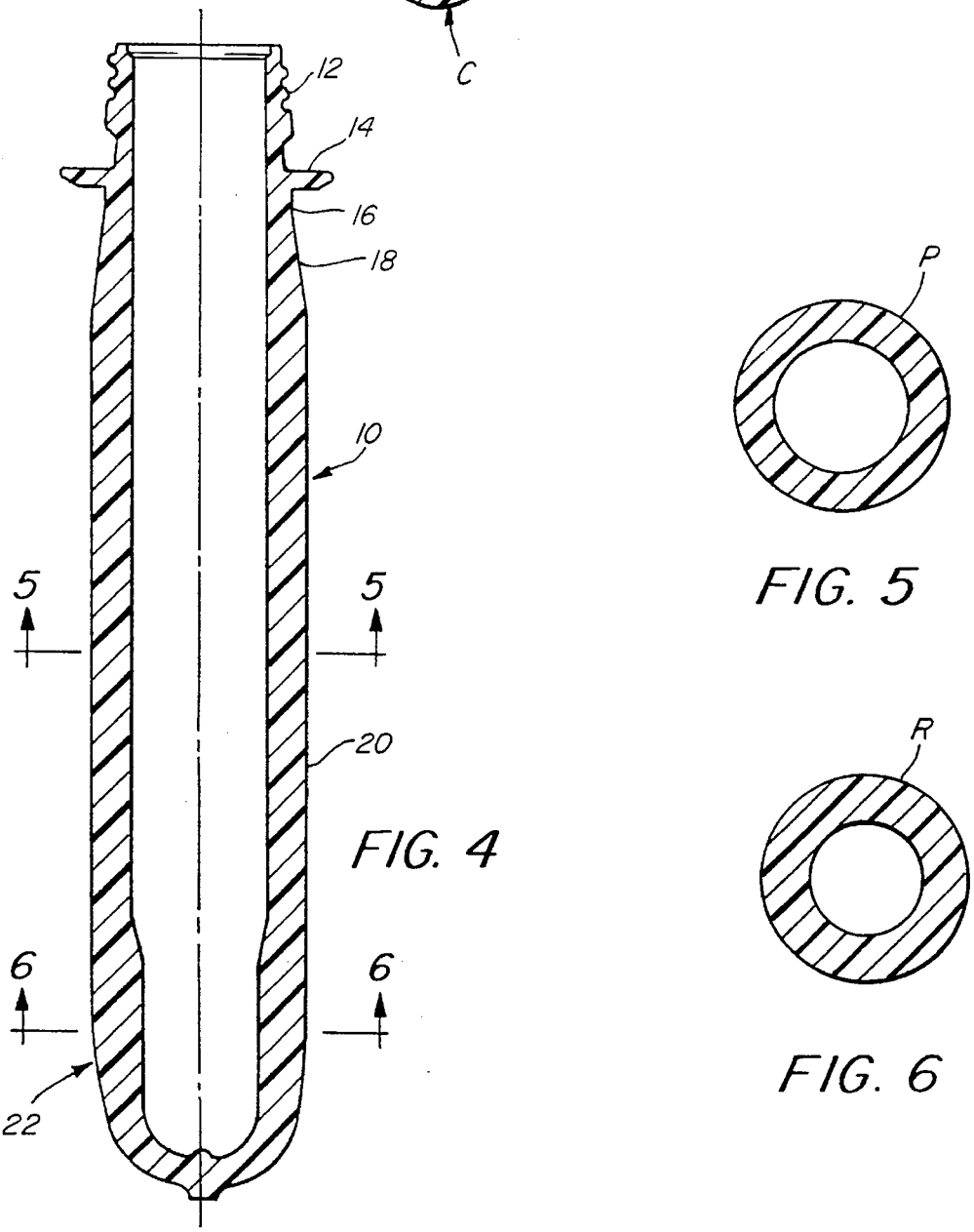
FIG. 4
FIG. 5
FIG. 6

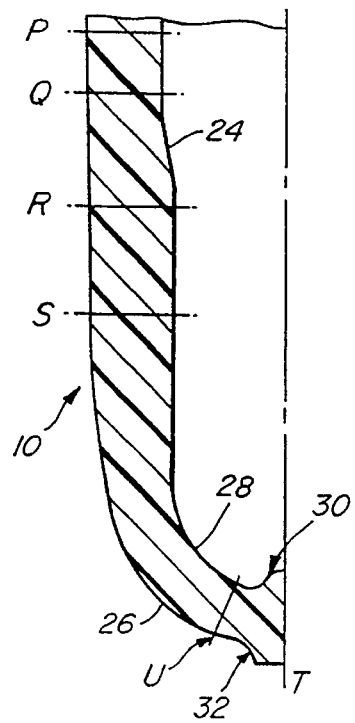
FIG. 7
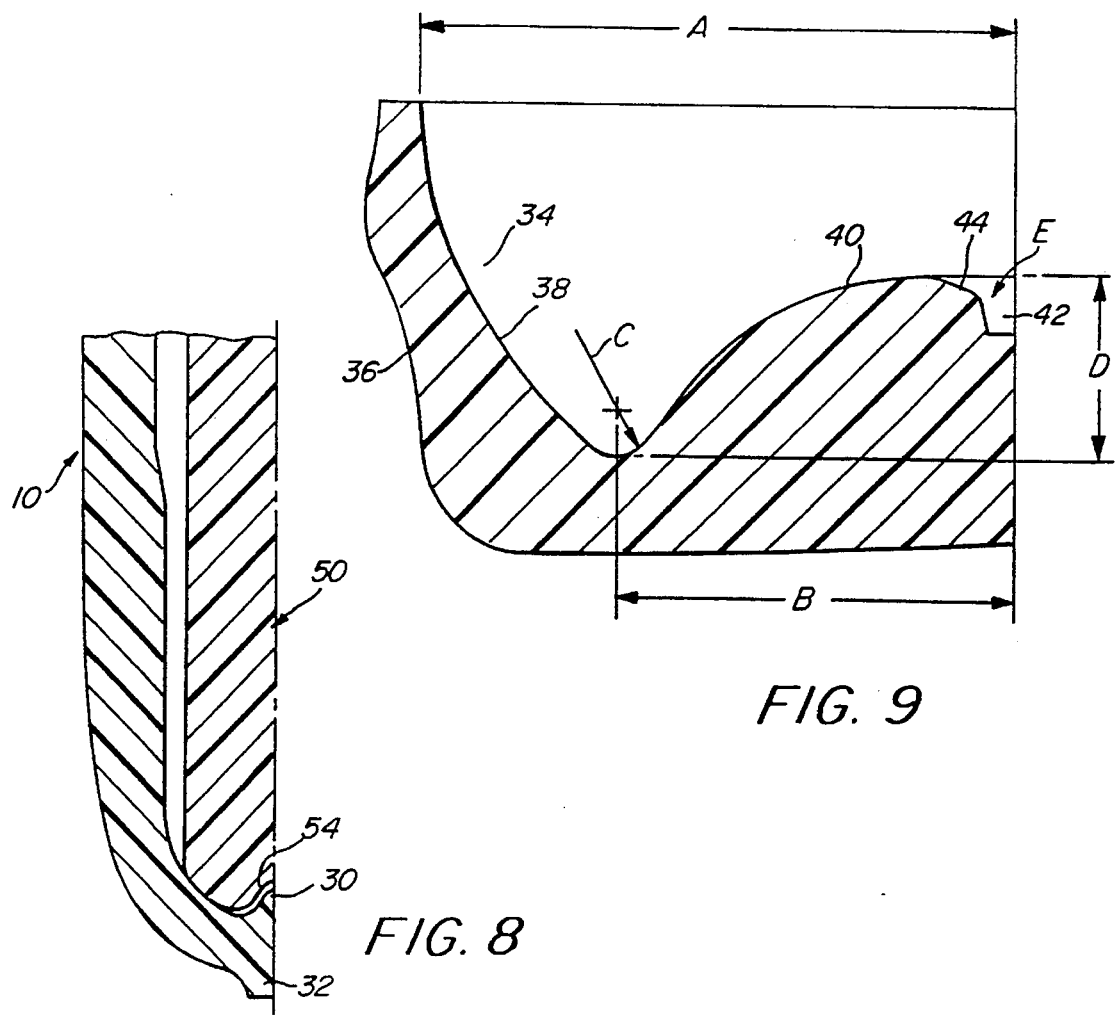
FIG. 9
FIG. 8

METHOD OF MAKING A REFILLABLE POLYESTER CONTAINER

This application is a continuation of U.S. Ser. No. 08/055,860 filed Apr. 30, 1993, abandoned, which is a continuation of U.S. Ser. No. 07/758,801 filed Sep. 12, 1991, now abandoned, which is a division of U.S. Ser. No. 07/488,247 filed Mar. 5, 1990, now U.S. Pat. No. 5,066,528.

This invention relates to new and useful improvements in plastic containers, and more particularly to a blow molded polyester container having an improved base construction which is resistant to strain cracks, and the preform from which such container is blow molded.

An economically and commercially viable, refillable plastic bottle reduces the existing land fill and recycle problems associated with disposable plastic containers, and more particularly with plastic containers formed of PET. In addition, a refillable container will permit the entry of the safer, lighter weight plastic containers into those markets currently dominated by glass, where legislation prohibits use of non-returnable packages.

The desirability of a refillable container formed of a polyester is specifically discussed, for example, in U.S. Pat. No. 4,334,627 granted Jun. 15, 1982. The disclosure of that patent is incorporated herein by reference.

At the present, it is to be understood that several polyester candidates provide the desired clarity and physical properties deemed necessary to produce refillable plastic containers. These polymers include polyethylene terephthalate (PET) acrylonitrile, polyarylate, polycarbonate, etc. Of the polymers commercially available, PET, at the present, offers the best balance of properties and cost/performance ratios.

The container specifically disclosed in U.S. Pat. No. 4,334,627 has been improved and is specifically disclosed in U.S. Pat. No. 4,725,464, granted Feb. 16, 1988. This patent makes specific reference to U.S. Pat. No. 4,334,627.

This invention relates to an improvement in the container specifically disclosed in U.S. Pat. No. 4,725,464 and the preform from which such container is blow molded.

A refillable container must go through a loop each time it is reused. The loop is comprised of (1) an empty caustic wash followed by (2) contaminant inspection and product filling/capping, (3) wharehouse storage, (4) distribution to wholesale and retail locations, and (5) purchase, use and empty storage by the consumer followed by eventual return to the bottler. It is the hot caustic wash which is most determinental to the reuse of a blow molded polyester container. It has been found that failure (via crack initiation and propogation) of biaxially oriented blow molded polyester containers exposed to the caustic wash baths occurs primarily in the base area and most particularly in the central part of the base area which has little or no orientation. It is to the improvement of the resistance of biaxially oriented blow molded polyester containers, particularly PET bottles and the like, that this invention relates.

In accordance with this invention, the specific configuration of the base forming portion of the preform has been modified so as to provide for an improved container base construction.

With the above and other objects in view that will hereinafter appear, the nature of the invention will be more clearly understood by reference to the following detailed description, the appended claims and the several views illustrated in the accompanying drawings.

FIG. 1 is a schematic showing the typical cycle or loop to which a refillable container must pass.

FIG. 2 is a vertical sectional view taken through a container of a configuration to which this invention specifically relates.

FIG. 3 is an enlarged fragmentary vertical sectional view taken through the base construction of the container of FIG. 2.

FIG. 4 is a vertical sectional view taken through a preform for forming the container of FIG. 2.

FIG. 5 is a horizontal sectional view taken generally along the line 5—5 of FIG. 4 and shows the specific cross section of the body portion of the preform.

FIG. 6 is a transverse horizontal sectional view taken generally along the line 6—6 of FIG. 4 and shows specifically the increase in thickness of the container base forming portion of the preform.

FIG. 7 is an enlarged fragmentary vertical sectional view taken through the base portion of the preform and shows the specific configuration of the improved preform construction.

FIG. 8 is a fragmentary vertical sectional view showing generally the base construction of FIG. 7 with the bottom central part of the base being engaged by a stretch blow centering rod.

FIG. 9 is a fragmentary vertical sectional view taken through a base portion of a blow mold in which the preform of FIG. 4 is blow molded to form the container of FIG. 2.

First of all, each container is subjected to a typical commercial caustic wash solution which is prepared 3.5 sodium hydroxide by weight with tap water. The wash solution is maintained at 140° F. and the containers are submerged uncapped in the wash for 15 minutes in accordance with a commercial bottle wash system.

After removal from the wash solution, the containers are rinsed in tap water and then filled with a desired liquid product which may be in the form of a carbonated drink which is packaged at 4.0±0.2 atmospheres and capped. Such a filled container must withstand a temperature of 100° F. at 50% RH for 24 hours.

The general loop through which a container passes in a single use of the container is shown in FIG. 1.

Generally, the degree of molecular orientation in the upper shoulder section and in the base section of a stretch blow molded container is lower than that in the body or panel section of such container. In a refillable container, all features such as flutes, grooves and steps, which are potential stress risers, are avoided in the upper shoulder region and in the base section. Any decorative embossing, flutes, grooves, etc. should be restricted to sections having higher degrees of orientation.

To achieve a good balance between creep-volume growth and thermal shrinkage in the hot caustic wash, the preform segment, which forms the panel section of the container, is configured to give a total thickness reduction ratio of 7.5 to 10.5, with a stretch ratio of 3.2 to 3.5 in the hoop direction and 2.3 to 2.9 in the axial direction.

The lower body and base forming portion of the preform (see FIG. 7) is configured to have sections PQ, QR, RS and ST. These form the segments pq, qr, rs and st, respectively, of the container shown in FIG. 3.

Referring now to the drawings in detail, reference is first made to FIG. 4 wherein there is illustrated the vertical cross section of a preform formed in accordance with this invention, the preform being generally identified by the numeral 10. The upper part of the preform 10 is of the same configuration as the preform of U.S. Pat. No. 4,725,464 and includes a threaded neck finish 12 which terminates at its lower end in a capping flange 14. Below the capping flange 14, there is a generally cylindrical section 16 which terminates in a section 18 of gradually increasing external diameter so as to provide for an increasing wall thickness. Below the section 18, there is an elongated body section 20, the extreme lower part of which forms an upper part of a container base forming portion generally identified by the numeral 22. The base forming portion 22 includes at least the section QR (FIG. 7) at the top thereof. As is best shown in FIG. 7, in the section QR, the internal diameter of the preform 10 gradually decreases as at 24 wherein the section RS is of increased wall thickness.

It will also be seen from FIG. 7 that the diameter of the section ST gradually reduces so as to reduce the wall thickness of the section ST. Additionally, the lower part of the section ST is generally of a hemispherical configuration as at 26. Furthermore, the inner surface of the section ST as at 28 is also of a generally hemispherical configuration, but with the surfaces 26 and 28 having different centers so that there is a continued gradual decrease in wall thickness.

At the center T of the section ST, there is a smoothly rounded upstanding projection 30 which is to be received in the lower end of a stretch blow centering rod, as shown in FIG. 8 and to be described in more detail hereinafter. Further, at the bottom of the center T, there is a downwardly directed axial projection 32 which is in the form of an elongated gate. The outer surface 26 of the preform 10 smoothly turns to form the outer surface of the projection 32.

Reference is now made to FIG. 9 wherein there is illustrated the configuration of the base portion of a blow mold cavity 34 defined by a customary type of blow mold 36. The blow mold cavity 34 in the base of the blow mold 36 has a lower outer generally hemispherical surface 38 which terminates in a base contact radius C which is centered a distance B which is 50 to 75% of the general overall radius A of the blow molded container. The radius C is 5 to 15% of the radius A.

It will be seen that the blow mold 36 is of a configuration so as to have a central dome 40 which is of a height D having a dimension which is 20 to 40% of the radius A.

It will also be seen that the dome 40 is provided with a central recess 42 of a size and shape to receive the projection 32. Further, the domed surface of the cavity 34 also includes a surface portion 44 which gradually slopes into the recess 42.

At this time it is also pointed out that the wall thickness of the preform at the cross section U in FIG. 7 is about 50 to 70% of the cross section of the preform in the segment RS.

The preform 10 is reheated to the required glass transition temperature, placed within the blow mold 36 in the conventional manner, engaged by a stretch blow centering rod 50, as is shown in FIG. 8, inflated by internal pressurization so as to be stretched in both the axial and hoop direction to match the configuration of the cavity 34 and form a container such as the container of FIG. 2 which is identified by the reference numeral 52. At this time, it is to be noted that the rod 50 has a recess 54 in the bottom thereof so as to clear the projection 30. At the same time, the projection 32 is received in the recess 42. As a result, when the container 52 is blow molded within the blow mold 36, both the inside surface and the outside surface of the base, generally indentified by the numeral 56 of the container 52, will be free of stress concentrations.

The container 52 will include the threaded neck 12 and the capping or support flange 14 in their original configurations. Immediately below the flange 14, the container 52 will have a generally unoriented thick wall portion 58 which terminates in a thin wall shoulder 60 which is formed from the preform section 18. Beneath the shoulder 60, there is the container body 62. In the illustrated form of container, the container body 62 is provided with an elongated panel section 64 which is of a reduced cross section and is intended to receive a suitable label (not shown). The body 62 continues below the panel section 64 as at 66 and terminates in the base 56, which, as previously described, is of the domed type.

The wall thicknesses of the various portions of the container 52 above the base construction 56 are clearly shown in FIG. 2. At this time it is pointed out that the container 52 is a 1.5 liter bottle and the preform 10 is configured to form the container 52.

Reference is now made to the enlarged showing of the base construction 56 found in FIG. 3. It is to be noted that the various lines P,Q,R,S and T find their equivalen lines in the container 52 as lines p,q,r,s and t, respectively. The base construction 56 starts generally at the line p and includes an axially extending and radially inwardly directed outer surface 68 which is generally hemispherical. It will be seen that there is a very slight increase in wall thickness between lines p and q while the section q,r has a gradual increase in wall thickness with the base construction terminating in a chime c which forms the support radius. In the section r,s, the wall thickness continues to increase with the base construction 56 being domed as at 72 and the wall thickness continuing to gradually increase until it reaches the point 70 which corresponds to the outer edge of the sloping surface 44. Thereafter, the base construction 56 continues to smoothly increase but at a slightly greater rate until the outer surface terminates in the projection 32 and the inner surface terminates in the projection 30.

To achieve the required wall thickness at chime c of the base construction 56, FIG. 3, the wall thickness of segment RS is about 1.10 to 1.30×that of the segment PQ. The transition from thin to thick wall section is gradual and smooth as described above. This eliminates any abrupt wall thickness change in the segment qr.

A higher degree of orientation in the dome segment st of the base 56 is achieved by optimizing the base configuration and by the gradual decrease of the preform wall thickness in the segment ST.

The projections 30, 32 at t insures that a crystalline region, if any, in this area does not weaken the section. As pointed out above, the elongated gate 32 is not crushed during blow molding.

Inasmuch as the base construction gradually increases in wall thickness as the orientation decreases, it will be seen that the desired strength requirement is obtained for the base construction 56 by way of smoothly curved surfaces which greatly reduce the possibility of stress cracking.

It is believed that 28–30% crystallinity is an optimum level for a refillable PET container which is preferably in the form of a bottle having an injection molded threaded neck finish. Further, it is to be understood that the preform, and thus the container, may be formed of a multilayer construction including internal barrier layers so as to extend shelf life. The application of such multilayer preforms may be utilized to reduce contaminate absorbtion, if filled with non-food products, and subsequent product contamination after washing and filling.

Although only a preferred embodiment of the refillable plastic bottle and the preform from which it is formed have been specifically set forth herein, it is to be understood that minor variations may be made in either the container, the preform or the blow mold in which the preform is blow molded to form the container without departing from the spirit and scope of the invention as defined by the appended claims.

We claim:

1. In a method of blow molding a preform into a returnable and refillable container, the method comprising the steps of:

(a) providing a molded polyester preform (10) having a closed bottom end and an open top end, a neck finish (12) at the open top end, a body-forming portion, a shoulder-forming portion (18) disposed between the neck finish (12) and the body-forming portion (20), and a base-forming portion (22) having generally hemispherical inner and outer surfaces (28, 26) at the closed bottom end and a thickened portion between the bottom end and the body-forming portion (20), the thickened portion having an increased wall thickness as compared to the wall thickness of the body-forming portion (20);

(b) expanding the preform (10) by axial and hoop stretching in a blow mold to form a transparent returnable and refillable container (52) having a biaxially oriented body and low orientation base, the container (52) including the neck finish (12), a shoulder (60) formed from the shoulder-forming portion of the preform, a body (64) formed from the body-forming portion of the preform, and a base (56) formed from the base-forming portion of the preform, the base (56) including a central downwardly-opening dome segment (72), a chime (rs), and an outer base portion (68) gradually increasing in diameter upwardly to the body;

the improvement comprising:

providing the thickened portion of the preform (10) with an upper cylindrical portion (RS) of the increased thickness and a lower tapered portion (ST) which gradually reduces in wall thickness towards the bottom end, and wherein during expansion the base-forming portion of the preform is expanded to form the container base with smoothly curved inner and outer surfaces so as to be free of stress concentrations, and the upper cylindrical portion (RS) is stretched to form the chime (rs) and the lower tapered portion (ST) is stretched to form the dome segment (72) which generally gradually decreases in wall thickness while increasing in orientation toward the chime (rs), wherein the container is able to withstand a number of reuse cycles without crack failure, wherein in each cycle the container is subjected to a hot caustic wash at a temperature of about 60° C. (140° F.) and product filling and capping at a pressure of at least about $4.05 \times 10^5 Nm^{-2}$ (4 atmospheres).

2. A method according to claim 1, wherein the preform base-forming portion further includes centering means for maintaining the base centered in the blow mold.

3. A method according to claim 2, wherein the centering means includes a centrally-located maximum wall thickness portion in the preform which is not stretched or crushed during expansion in the blow mold and forms a thickened gate region in the container.

4. A method according to claim 1, wherein during expansion in the blow mold the outer base portion is formed with an upper portion (pq) adjacent the body having substantially the same wall thickness as the body (64) and lower portion (qr) adjacent the chime (rs) which gradually increases in wall thickness towards the chime (rs).

5. A method according to claim 1, wherein the chime (rs) is formed at a distance B which is 50 to 75% of the overall container radius A.

6. A method according to claim 5, wherein during expansion in the blow mold the chime (rs) is formed with a contact radius (C) which is 5 to 15% of the overall container radius A.

7. A method according to claim 6, wherein during expansion in the blow mold the lowered tapered portion is stretched to form the dome segment (70) with a height D which is 20 to 45% of the overall container radius A.

8. A method according to claim 1, wherein the generally hemispherical inner and outer surfaces of the preform bottom end are provided with different centers so that there is a continuing gradual reduction in wall thickness in the bottom end.

9. A method according to claim 3, wherein the centering means includes an outer projection (32) which during expansion in the blow mold is received in a central recess of the blow mold.

10. A method according to claim 9, wherein the outer projection (32) is provided with an axially elongated gate for engagement with an axial recess (42) in the blow mold and the axial gate is joined to the outer base surface in a smoothly tapering connection for engagement with a sloping surface (44) in the blow mold.

11. A method according to any one of claims 3 and 9 wherein the centering means includes an inner projection (30) which during expansion in the blow mold is received in a recess in a lower end of a stretch blow centering rod.

12. A method according to claim 1, wherein during expansion in the blow mold the body-forming portion is stretched at an area thickness reduction ratio of from about 7.5 to about 10.5.

13. A method according to claim 1, wherein during expansion in the blow mold the body-forming portion is stretched in the hoop direction from about 3.2 to about 3.5 and in the axial direction about 2.3 to about 2.9.

14. A method according to claim 1, wherein during expansion in the blow mold the upper cylindrical portion (RS) is stretched to form the chime (rs) with a wall thickness of from about 1.1 to about 1.3 times the thickness of an upper base portion (pq) adjacent the body (64).

* * * * *